United States Patent
van Borselen et al.

(10) Patent No.: US 10,359,528 B2
(45) Date of Patent: Jul. 23, 2019

(54) SYSTEMS AND METHODS FOR RANDOMIZING FIRING TIMES OF SIMULTANEOUS SOURCES IN MARINE SURVEYS

(71) Applicant: PGS Geophysical AS, Lysaker (NO)

(72) Inventors: Roald Gunnar van Borselen, Voorschoten (NL); Rolf Huibert Baardman, Rotterdam (NL)

(73) Assignee: PGS Geophysical AS, Oslo (NO)

( * ) Notice: Subject to any disclaimer, the term of this patent is extended or adjusted under 35 U.S.C. 154(b) by 1371 days.

(21) Appl. No.: 13/835,711

(22) Filed: Mar. 15, 2013

(65) Prior Publication Data
US 2014/0269169 A1    Sep. 18, 2014

(51) Int. Cl.
*G01V 1/38* (2006.01)

(52) U.S. Cl.
CPC ................ *G01V 1/3861* (2013.01)

(58) Field of Classification Search
CPC .............................. G01V 1/38; G01V 1/3861
USPC ........................................................... 367/15
See application file for complete search history.

(56) References Cited

U.S. PATENT DOCUMENTS

| | | | |
|---|---|---|---|
| 3,697,938 A | 10/1972 | Taner | |
| 4,908,801 A * | 3/1990 | Bell | G01V 13/00 181/111 |
| 4,953,657 A | 9/1990 | Edington | |
| 5,198,979 A * | 3/1993 | Moorhead | G01V 1/362 367/38 |
| 5,764,516 A * | 6/1998 | Thompson | G01V 1/362 367/54 |
| 5,784,040 A * | 7/1998 | Kobayashi | G09G 3/3611 345/690 |
| 5,924,049 A | 7/1999 | Beasley et al. | |
| 6,545,944 B2 | 4/2003 | de Kok | |
| 6,574,567 B2 | 6/2003 | Martinez | |
| 6,906,981 B2 | 6/2005 | Vaage | |
| 7,935,545 B2 * | 5/2011 | Winkler | H01L 21/67225 257/E21.001 |
| 8,339,896 B2 | 12/2012 | van Borselen et al. | |
| 8,345,510 B2 | 1/2013 | Hegna et al. | |
| 8,553,496 B2 | 10/2013 | Decker et al. | |

(Continued)

FOREIGN PATENT DOCUMENTS

| | | |
|---|---|---|
| GB | 2 390 902 A | 1/2004 |
| GB | 2390902 A | 1/2004 |

(Continued)

OTHER PUBLICATIONS

James Brady et al., "Electromagnetic Sounding for Hydrocarbons", Oilfield Review, Spring 2009, 21, No. 1, pp. 4-19.

(Continued)

*Primary Examiner* — Isam A Alsomiri
*Assistant Examiner* — Amie M Ndure

(57) ABSTRACT

Computational systems and methods for randomizing the order in which multiple sources are fired in simultaneous source acquisition are described. In one aspect, pseudo-randomly shifted time delays are generated for each shot interval of a marine-survey-time line. Each shifted time delay is assigned to one or the sources. The sources within each shot interval are fired based on the shifted time delays.

50 Claims, 15 Drawing Sheets

(56) References Cited

U.S. PATENT DOCUMENTS

| | | | |
|---|---|---|---|
| 8,724,428 B1* | 5/2014 | Sallas | G01V 1/005 367/38 |
| 2004/0013037 A1* | 1/2004 | Vaage | G01V 1/3808 367/21 |
| 2004/0049347 A1* | 3/2004 | Fookes | G01V 1/3808 702/14 |
| 2004/0236955 A1* | 11/2004 | Chow | G06F 21/14 713/190 |
| 2008/0241971 A1* | 10/2008 | Winkler | H01L 21/67225 438/5 |
| 2008/0285381 A1* | 11/2008 | Moldoveanu | G01V 1/3808 367/20 |
| 2009/0046536 A1* | 2/2009 | Kinkead | G01V 1/38 367/21 |
| 2010/0039894 A1* | 2/2010 | Abma | G01V 1/362 367/52 |
| 2010/0271904 A1 | 10/2010 | Moore et al. | |
| 2011/0158042 A1 | 6/2011 | Moldoveanu et al. | |
| 2011/0188343 A1 | 8/2011 | Guigne et al. | |
| 2011/0217123 A1* | 9/2011 | Jewell | F16L 1/16 405/158 |
| 2012/0014213 A1* | 1/2012 | Eick | G01V 1/3808 367/23 |
| 2012/0147701 A1* | 6/2012 | Ross | G01V 1/005 367/23 |
| 2012/0290214 A1* | 11/2012 | Huo | G01V 1/005 702/16 |
| 2013/0121109 A1 | 5/2013 | Baardman et al. | |
| 2013/0170316 A1* | 7/2013 | Mandroux | G01V 1/3808 367/16 |
| 2014/0133271 A1* | 5/2014 | Sallas | G01V 1/005 367/21 |
| 2014/0198607 A1* | 7/2014 | Etienne | G01V 1/247 367/15 |
| 2014/0355379 A1 | 12/2014 | Moldoveanu et al. | |

FOREIGN PATENT DOCUMENTS

| | | |
|---|---|---|
| SU | 1543357 A1 | 7/1988 |
| WO | 2005062075 A1 | 7/2005 |
| WO | 2007025933 A1 | 3/2007 |

OTHER PUBLICATIONS

Staff Report, "2014 Mentorious Awards for Engineering Innovation", www.epmag.com/item/print/2014-Mentorious-Awards-Engineering-Innovation-132699, Aug. 28, 2014. see p. 8, 12 pages total.

Fromyr, Eivind et al., "Flam—A Simultaneous Source Wide Azimuth Test", SEG Las Vegas 2008 Annual Meeting, pp. 2821-2825.

Eurasian Patent Search Report and Notification of a Publishing date of Patent Search Report and of filing a Request for Substantive Examination dated Jul. 22, 2014 for patent application No. 201490431, and English translation thereof, 4 pages.

Search Report, Application No. 14158744.4, dated Dec. 21, 2015.

Tan, C.Q. et al., "Separation of Blended Data by Iterative Denoising", 74th EAGE Conference & Exhibition incorporating SPE EUROPEC 2012, Jun. 4-7, 2012.

Li, et al., "Short Note 3-D coherency filtering," Geophysics, vol. 62, No. 4, Jul.-Aug. 1997, pp. 1310-1314.

* cited by examiner

Group durations g1=0-50ms g2=51-100ms g3=101-150ms g4=151-200ms g5=201-250ms g6=251-300ms g7=301-350ms g8=351-400ms g9=401-450ms g10=451-500ms g11=501-550ms g12=551-600ms g13=601-650ms g14=651-700ms g15=701-750ms g16=751-800ms g17=801-850ms g18=851-900ms g19=901-950ms g20=951-1000ms

FIG. 5B

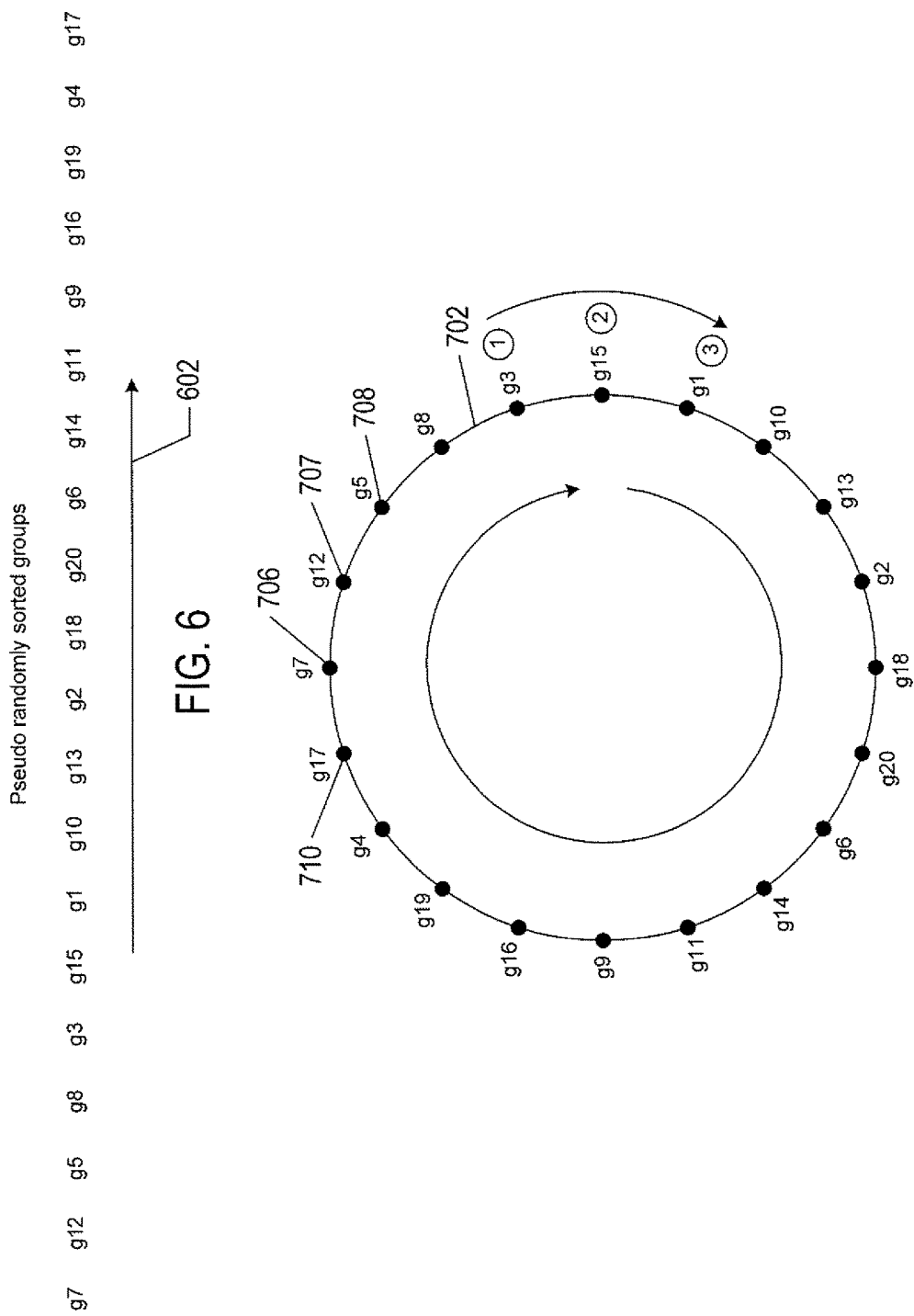

SYSTEMS AND METHODS FOR RANDOMIZING FIRING TIMES OF SIMULTANEOUS SOURCES IN MARINE SURVEYS

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and reservoir monitoring. For a typical marine seismic survey, an exploration-seismology vessel tows a seismic source and the same, or another vessel, tows one or more streamers that form a seismic data acquisition surface below the surface of the water and over a subterranean formation to be surveyed for mineral deposits. The vessel contains seismic acquisition equipment, such as navigation control, seismic source control, seismic receiver control, and recording equipment. The seismic source control causes the seismic source, which is typically an array of source elements, such as air guns, to produce acoustic impulses at selected times. The seismic source is often described as being "fired" or "shot" to produce the acoustic impulse. Each acoustic impulse is a sound wave that travels down through the water and into the subterranean formation. At each interface between different types of rock, a portion of the sound wave is transmitted and another portion is reflected back toward the body of water to propagate toward the surface. The streamers towed behind the vessel are elongated cable-like structures. Each streamer may include a number of seismic receivers or multi-component sensors that detect pressure and particle motion wavefields associated with the sound waves reflected back into the water from the subterranean formation. With conventional seismic data acquisition, seismic data generated by the receivers is recorded over a finite period and is considered to emanate from a single source. In a simultaneous source acquisition, multiple sources are fired within a small time window called a "shot interval" and the recorded seismic data cannot be considered to emanate from a single source but from multiple sources recorded with a time overlap. Processing methods should take these overlapping recordings into account. One way to do so is to actively separate the recorded data over the sources and for all gathers it can be assumed that acoustic energy emanates from a single source. The petroleum industry seeks systems and methods that reduce seismic interference in the seismic data generated by the receivers for simultaneous source acquisition.

DESCRIPTION OF THE DRAWINGS

FIG. 5B shows an example listing of duration group time intervals.

FIG. 6 shows a random ordering of duration groups.

FIG. 7 shows a round-robin schedule of random ordered duration groups shown in FIG. 6.

DETAILED DESCRIPTION

Figure 1A:
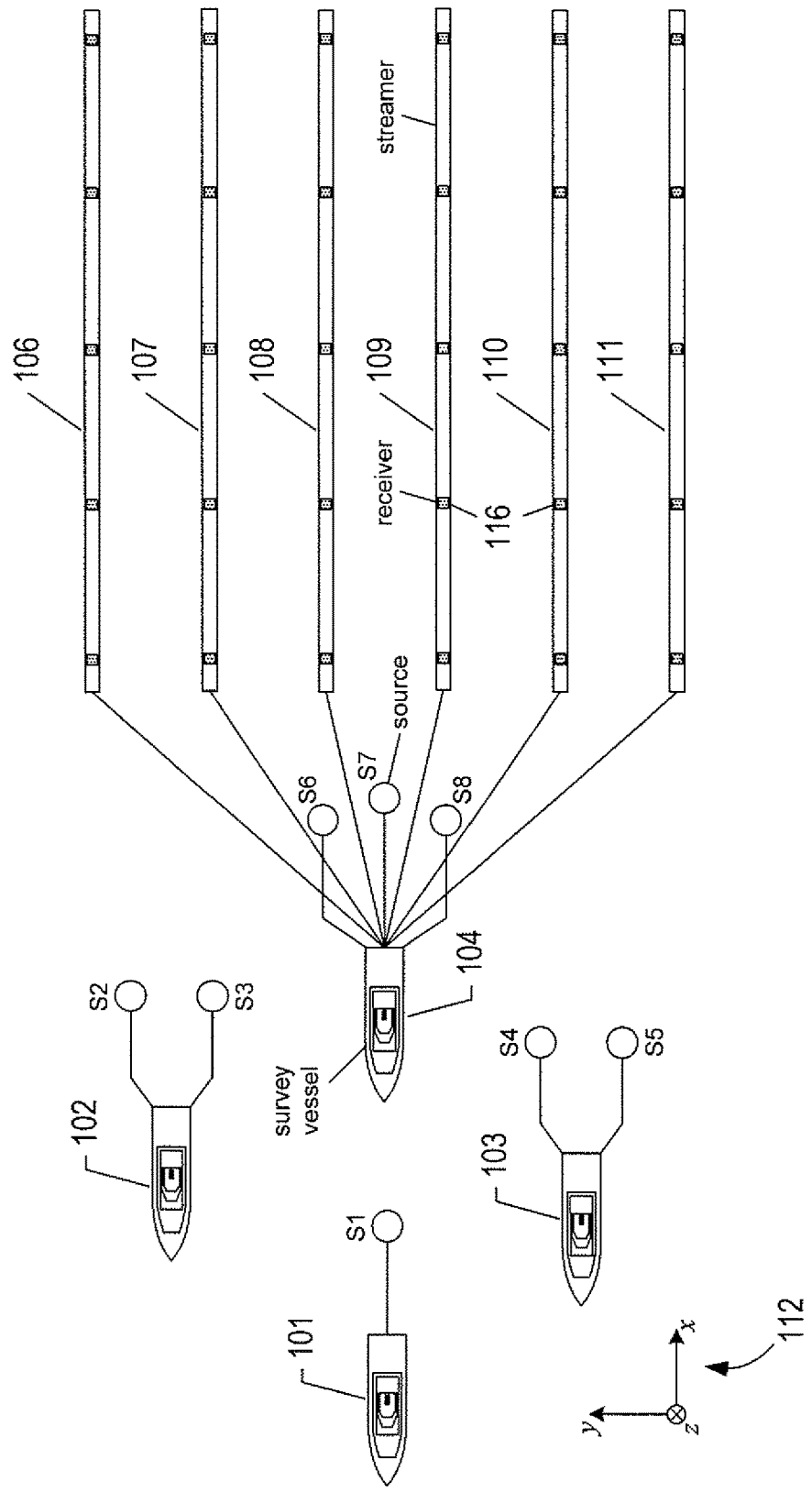
FIGS. 1A-1B show top and side elevation views of an example marine seismic data acquisition system.

This disclosure presents computational systems and methods for optimizing randomization of the order in which multiple sources are fired in simultaneous source acquisition ("SSA"). The multiple sources are fired in shot intervals separated by waiting periods in which the sources are not fired. The systems and methods described below are directed to pseudo randomizing the order in which the sources are fired within each shot interval. The order in which the multiple sources are fired in a shot interval is pseudo randomized so that receiver data processing methods can optimally separate recorded data from individual source gathers. In other words, the methods and systems pseudo randomize the firing times of the multiple sources in the shot intervals such that each source is fired at a different time and the time difference between firing any two consecutive sources is greater than a specified parameter.

In conventional seismic data acquisition, data generated by the receivers and recorded over a finite time period is considered to come from a single source. In SSA, the seismic wavefields generated by multiple sources contribute to the data generated over a finite time period by the same set of receivers. Alternatively, receiver data can be generated and recorded continuously, where the recorded energy from different sources interferes with each other. The aim of SSA is to reduce the time to acquire the seismic data, and/or to increase the diversity of the data in terms of fold, azimuth, and offsets.

One approach to processing receiver data is to separate the sources, such that single source data gathers are obtained as if the interference between the sources never existed. This approach is called "active separation," which benefits from randomly firing multiple sources. With active separation, one of the multiple sources is selected as a primary source and the receiver data are aligned with the firing time of the primary source and is sorted in an appropriate domain, such as common receiver domain or common offset domain. Ideally, randomized firing times for the multiple sources is manifest so that the energy from the remaining secondary sources will interfere and appear incoherent, whereas the receiver data from the primary source will appear as coherent energy. As a result, methods that separate the sources in time based on coherency filtering can be used. However, strategies for randomizing time delays for the sources in SSA may lead to secondary source energy that appears coherent in the seismic data generated by the receivers, which may happen when, within a certain number of shot intervals, two or more delay times for any of the simultaneous sources are identical or close to each other. As a result, when coherency-based separation techniques are used, the coherency filter acting over a certain time-space window is not able to determine that the energy from the secondary sources is incoherent, leading to suboptimal results.

By contrast, computational systems and methods described below use a multiple-source randomization technique where the order or sequence in which the multiple sources are fired is randomized from shot interval to shot interval in order to avoid coherence in the energy output from the secondary sources. The randomized firing order for the multiple sources ensures that within the operator length of the separation technique, the firing time differences between subsequent traces in the space-time window is large enough for the secondary source energy to become incoherent.

Figure 1B:
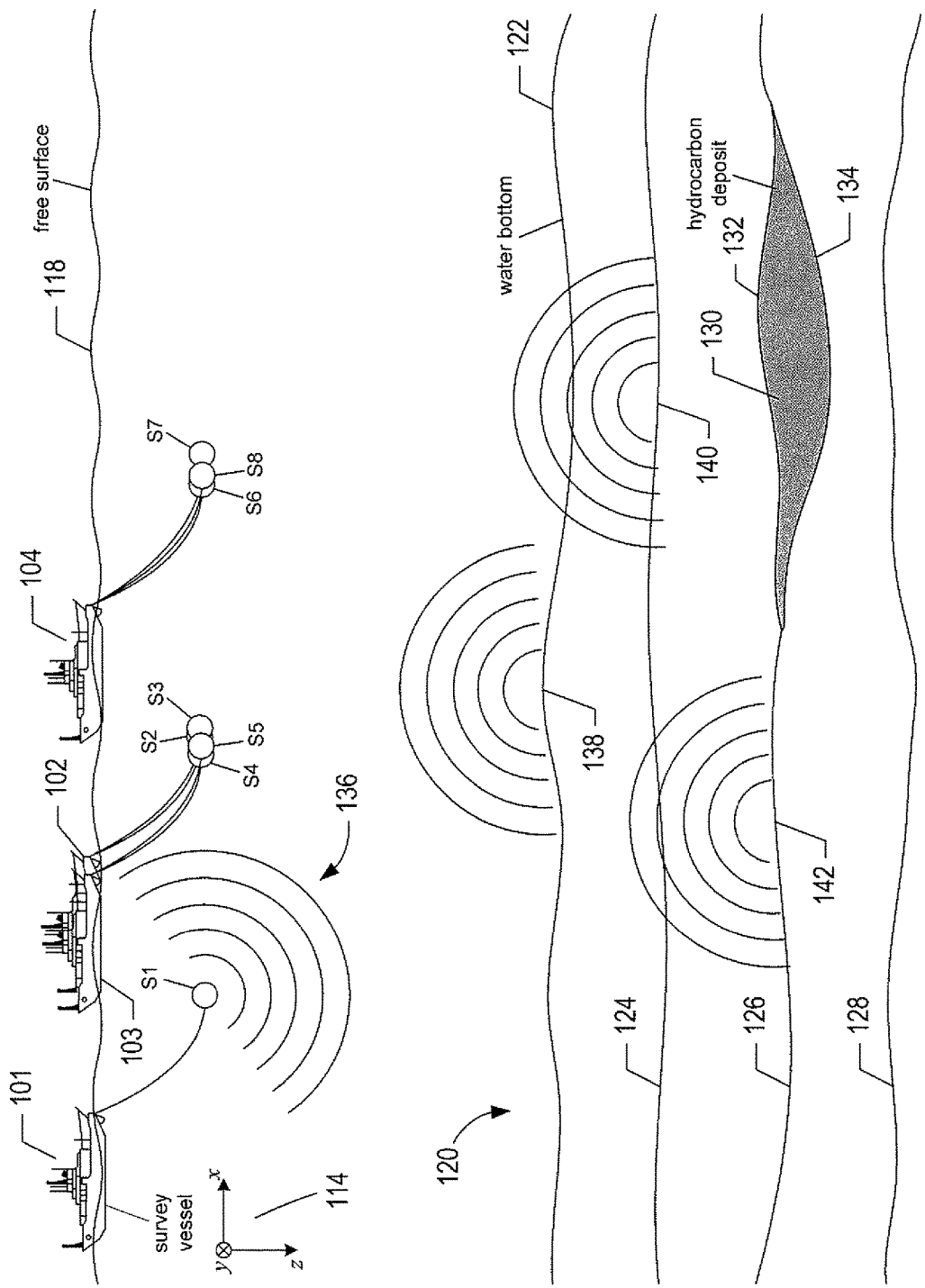

FIGS. 1A-1B show a top view and side-elevation view, respectively, of an example marine seismic data acquisition system composed of four exploration seismology survey vessels 101-104. As illustrated, each of the survey vessels tows at least one of eight separate sources denoted by S1, S2, S3, S4, S5, S6, S7, and S8. The sources S1-S8 are an example of a "simultaneous source," the operation of which is described in greater detail below. In particular, survey vessel 101 tows the source S1, survey vessel 102 tows the sources S2 and S3, survey vessel 103 tows the sources S4 and S5, and the survey vessel 104 tows the sources S6, S7, and S8. Different survey designs may entail various different number and distributions of sources amongst the survey vessels, which also may vary in number. In FIG. 1A, survey vessel 104 also tows six separate streamers 106-111 located in a body of water. In this example, each streamer is attached at one end to the survey vessel 104 via a streamer-data-transmission cable. The streamers 106-111 form a planar horizontal receiver acquisition surface with respect to the free surface of the body of water. However, in practice, the receiver acquisition surface can be smoothly varying due to active sea currents and weather conditions. In other words, although the streamers 106-111 are shown as being straight, in practice, the towed streamers may undulate as a result of dynamic conditions of the body of water in which the streamers are submerged. It should be noted that a receiver acquisition surface is not limited to having a horizontal orientation with respect to the free surface 112. The streamers may be towed at depths that orient the receiver acquisition surface at an angle with respect to the free surface 112 or so that one or more of the streamers are towed at different depths. It should also be noted that a receiver acquisition surface is not limited to six streamers. In practice, a receiver acquisition surfaces can be composed of as few as one streamer to as many as 20 or more streamers. Certain embodiments include one or more streamer towed by one or more of the survey vessels 101-104.

FIG. 1A includes an xy-plane 112 and FIG. 1B includes xz-plane 114 of a Cartesian coordinate system having three orthogonal, spatial coordinate axes labeled x, y and z. The coordinate system is used to specify orientations and coordinate locations within a body of water. The x-direction specifies the position of a point in a direction parallel to the length of the streamers and is referred to as the "in-line" direction. The y-direction specifies the position of a point in a direction perpendicular to the x-axis and substantially parallel to the free surface and is referred to as the "cross-line" direction. The z-direction specifies the position of a point perpendicular to the xy-plane (i.e., perpendicular to the free surface) with the positive z-direction pointing downward away from the free surface. Streamer depth below the free surface can be estimated at various locations along the streamers using depth measuring devices attached to the streamers. For example, the depth measuring devices can measure hydrostatic pressure or utilize acoustic distance measurements. The depth measuring devices can be integrated with depth controllers, such as paravanes or water kites, that control the depth and position of the streamers as the streamers are towed through a body of water. The depth measuring devices are typically placed at about 300 meter intervals along each streamer. Note that in other embodiments buoys attached to the streamers 106-111 can be used to maintain the orientation and depth of the streamers below the free surface.

In FIG. 1A, shaded rectangles 116 represent receivers or sensors that are spaced-apart along the length of each streamer. The streamers 106-111 are long cables containing power and data-transmission lines that connect the receivers 116 to seismic acquisition equipment located on board the survey vessel 104. In one type of exploration seismology, each receiver is a multi-component sensor including one or more geophones that each detect displacement within the body of water over time by detecting particle motion, velocities or accelerations, and a hydrophone that detects variations in water pressure over time. The streamers 106-111 and the survey vessels 101-104 include sophisticated sensing electronics and data-processing facilities that allow measurements from each receiver to be correlated with absolute positions on the free surface and absolute three-dimensional positions with respect to an arbitrary three-dimensional coordinate system.

The sources S1-S8 are each composed of one or more sources elements, such as water guns, air guns or marine vibrators, suspended from floats below the free surface. The air guns and water guns can be selected with different chamber volumes and arranged in a particular manner within the array to generate a resulting acoustic impulse. The marine vibrators may be used in step function mode to generate a resulting acoustic impulse. In other embodiments, the sources S1-S8 can be electromagnetic ("EM") field sources. An EM-field source includes two source electrodes located at opposite ends of a cable to form an electric bipole transmission antenna, which is connected to a survey vessel via a source lead-in cable. An EM-field source electrodes and cable can be horizontally or vertically arranged. FIG. 1B shows a side-elevation view of the survey vessels 101-104 towing the sources S1-S8 below a free surface 118 and above a subterranean formation 120. The streamers 106-111 towed by survey vessels 102-104 are omitted for convenience. Curve 122 represents a solid surface at the bottom of a body of water located above the subterranean formation 120. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a hydrocarbon-rich subterranean deposit, the depth and positional coordinates of which may be determined by analysis of seismic data collected during a marine survey. As the survey vessels 101-104 move over the subterranean formation 120 the sources S1-S8 produce short duration pressure waves called acoustic impulses at spatial and temporal intervals as described in greater detail below. For the sake of convenience, FIG. 1B illustrates an acoustic impulse expanding outward from the source S1 as a pressure wavefield 136 represented by semicircles of increasing radius centered at the source S1. The wavefronts are, in effect, shown in vertical plane cross section in FIG. 1B. The outward and downward expanding portion of the pressure wavefield 136 is called the "primary wavefield," which eventually reaches the solid surface 122 of the subterranean formation 120, at which point the primary wavefield is partially reflected from the solid surface 122 and partially refracted downward into the solid, subterranean formation 120, becoming elastic waves within the subterranean formation 120. In other words, in the body of water, the acoustic impulse is composed of compressional pressure waves, or P-waves, while in the solid subterranean formation 120, the waves include both P-waves and transverse waves, or S-waves. Within the subterranean formation 120, at each interface between different types of materials or at discontinuities in density or in one or more of various other physical characteristics or parameters, downward propagating waves are partially reflected and partially refracted. As a result, each point of the surface 122 and each point of the interfaces 124, 126, and 128 becomes a potential secondary point source from which acoustic and elastic wave energy, respectively, may emanate upward toward the streamers (not shown) towed by the survey vessel 104 in response to the acoustic impulse generated by the source S1 and downward-propagating elastic waves generated from the pressure impulse. As shown in FIG. 1B, secondary waves of significant amplitude are generally emitted from points on or close to the solid surface 122, such as point 138, and from points on or very close to interfaces in the subterranean formation 120, such as points 140 and 142. Tertiary waves called "receiver ghosts" are produced by secondary waves that are reflected from the free surface 118 back towards the streamers and the subterranean formation 120.

The secondary waves are generally emitted at different times within a range of times following the initial acoustic impulse. A point on the solid surface 120, such as the point 138, receives a pressure disturbance corresponding to the initial acoustic impulse more quickly than a point within the subterranean formation 120, such as points 140 and 142. Similarly, a point on the solid surface 122 directly beneath the source S1 receives the acoustic impulse sooner than a more distant-lying point on the solid surface 122. Thus, the times at which secondary and higher-order waves are emitted from various points within the subterranean formation 120 are related to the distance, in three-dimensional space, of the points from the source S1. It should be noted that acoustic impulses generated by the other sources S2-S8 expand outward as pressure wavefields that interact with the subterranean formation 120 is the same manner as the acoustic impulse generated by the source S1 described above.

Acoustic and elastic waves, however, travel at different velocities within different materials as well as within the same material under different pressures. Therefore, the travel times of the primary wavefield and secondary wavefield emitted in response to the primary wavefield are complex functions of distance from the source 104 as well as the materials and physical characteristics of the materials through which the primary wave travels. In addition, the secondary expanding wavefronts may be altered as the wavefronts cross interfaces and as the velocity of sound varies in the media are traversed by the wave. The superposition of waves emitted from within the subterranean formation 120 in response to the primary wavefield is a generally very complicated wavefield that includes information about the shapes, sizes, and material characteristics of the subterranean formation 120, including information about the shapes, sizes, and locations of the various reflecting features within the subterranean formation 120 of interest to exploration seismologists.

Subterranean formations located beneath a body of water can also be investigated using ocean bottom seismic techniques. One example of these techniques is implemented with ocean bottom cables ("OBCs"). The OBCs are similar to the towed streamer cables described above in that the OBCs include a number of spaced-apart receivers, such as receivers deployed approximately every 25 to 50 meters, but the OBCs are laid on or near the water bottom 122. The OBCs may be electronically connected to an anchored recording vessel that provides power, instrument command and control, and data telemetry of the sensor data to the recording equipment on board the vessel. Alternatively, ocean bottom seismic techniques can be implemented with autonomous systems composed of receiver nodes that are deployed and recovered using remote operated vehicles. The receiver nodes may be placed on or near the water bottom 122 in a fairly coarse grid, such as approximately 400 meters apart. Autonomous receiver systems are typically implemented using one of two types of receiver node systems. A first receiver node system is a cable system in which the receiver nodes are connected by cables to each other and are connected to an anchored recording vessel. The cabled systems have power supplied to each receiver node along a cable, and seismic data are returned to the recording vessel along the cable or using radio telemetry. A second receiver node system uses self-contained receiver nodes that have a limited power supply, but the receiver nodes typically have to be retrieved in order to download recorded seismic data. Whether using OBCs or autonomous receiver nodes, source vessels equipped with two or seismic sources as described above with reference to FIGS. 1A and 1B can be used to generate acoustic impulses at spatial and temporal intervals as the source vessels move across the free surface.

Simultaneous sources are not intended to be limited to eight sources S1-S8 towed by four survey vessels 101-104, as shown in FIGS. 1A and 1B. In practice, the number of sources comprising a simultaneous source can range from as few as two sources to as many as 10 or more sources, and the sources can be distributed over any suitable number of survey vessels. For the sake of convenience and brevity, the example set of eight sources S1-S8 are used to describe methods and systems for operating a simultaneous source in a pseudo-simultaneous manner to achieve temporal overlap in recording of the wavefields generated by the sources. In general, the methods described below can be extended to n simultaneous sources, where n is an integer greater than "1."

Figure 2:
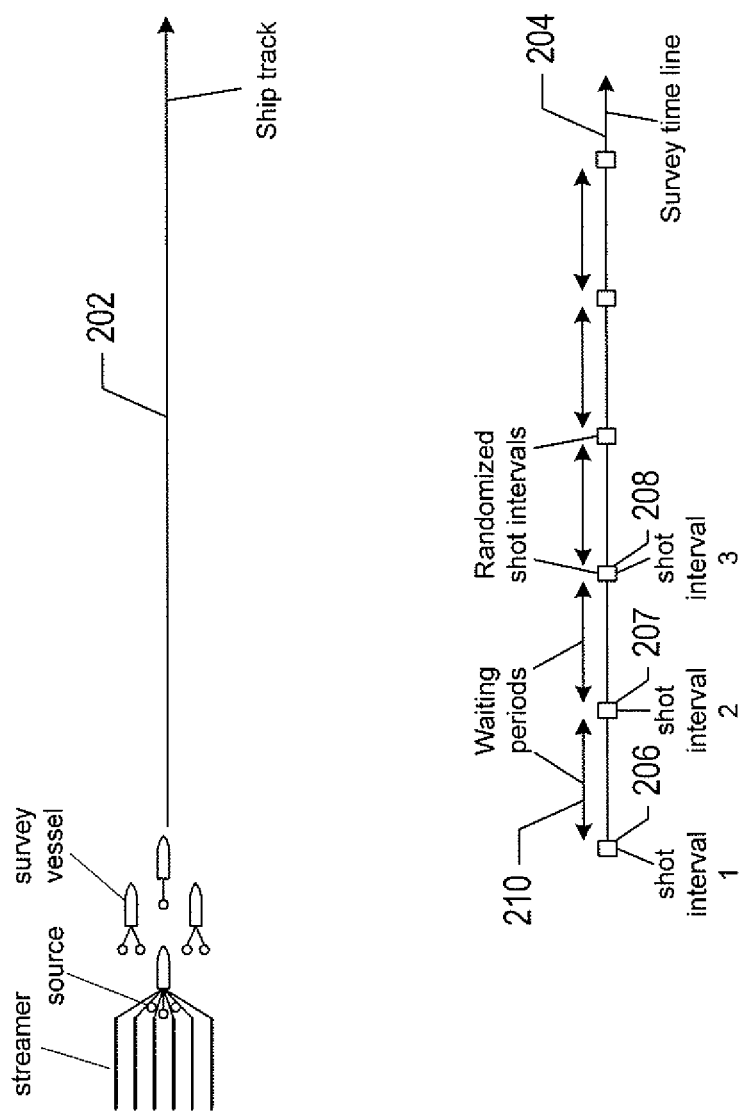
FIG. 2 shows a ship track and marine-survey-time line for a marine seismic acquisition system.

FIG. 2 shows the marine seismic acquisition system shown in FIGS. 1A-1B traveling a ship track represented by a directional arrow 202. Directional arrow 204 represents a marine-survey-time line associated with operation of the sources S1-S8 as the seismic acquisition system travels the ship track 202. Boxes represent shot intervals in which the sources S1-S8 are fired, and double-headed directional arrows 210 represent waiting periods between shot intervals. For example, the first three shot intervals 206-208 may have durations of approximately 1 second and the waiting periods 210 may range from 6-8 seconds. As the seismic acquisition system travels the ship track 202, the sources S1-S8 are fired in a pseudo-simultaneous manner described below within each shot interval, and the sources S1-S8 are not fired during the waiting periods. The pseudo-simultaneous manner described below for firing the sources S1-S8 results in temporal overlap in recording the wavefields output by the sources. Pseudo-simultaneous firing of the sources S1-S8 means that each one of the sources S1-S8 is fired with a unique randomized time delay. The randomized firing time delays avoid constructive interference of the emitted wavefields. Methods for generating a random distribution of the firing time delays for the sources S1-S8 are described below.

Figure 3:
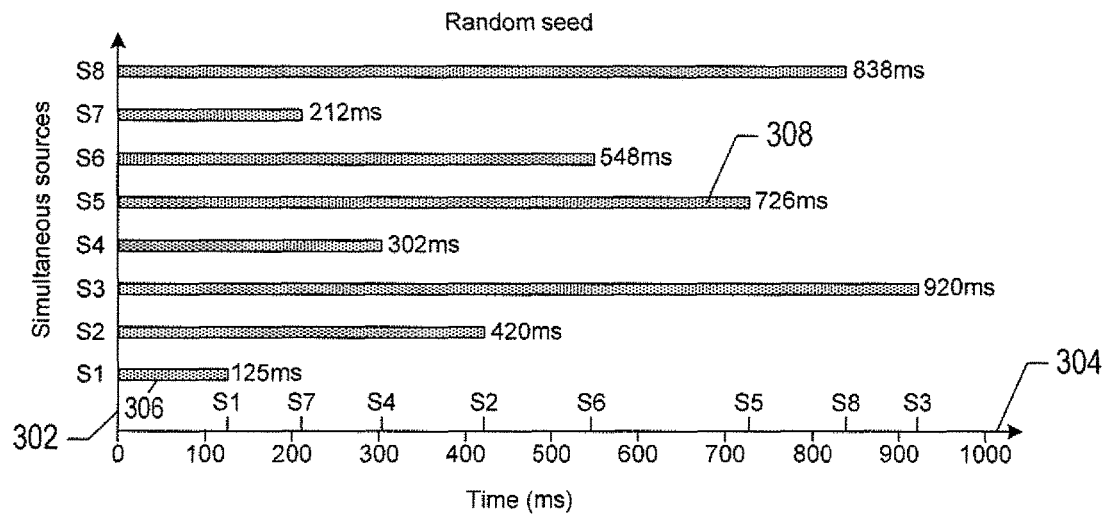
FIG. 3 shows a histogram of an example of random seed time delays for the eight sources.

FIG. 3 shows a histogram of an example of random seed time delays for the eight sources S1-S8. Vertical axis 302 identifies the eight sources S1-S8, and horizontal axis 304 represents an example of a shot interval that ranges from 0 to 1000 milliseconds (i.e., 1 second). All eight of the sources S1-S8 are fired according to time delays represented by shaded bars extending from the source axis 302. The random seed time delays are randomly determined with the constraint that the random seed avoids constructive interference. Note also that the time delays in the shot intervals are not the same and cannot be closer than a user specified parameter. The duration of each time delay corresponds to the length of each bar and is marked along the time axis 304. For example, the source S1 is assigned a time delay of 125 ms as represented by the length of bar 306 and the source S5 is assigned a time delay of 726 ms as represented by the length of the bar 308. As a result, the set of time delays shown in FIG. 3 is called the "random seed" and each time delay is called a "random seed time delay." The random seed is used to determine random time delays for firing the sources S1-S8 in each shot interval.

Figure 4:
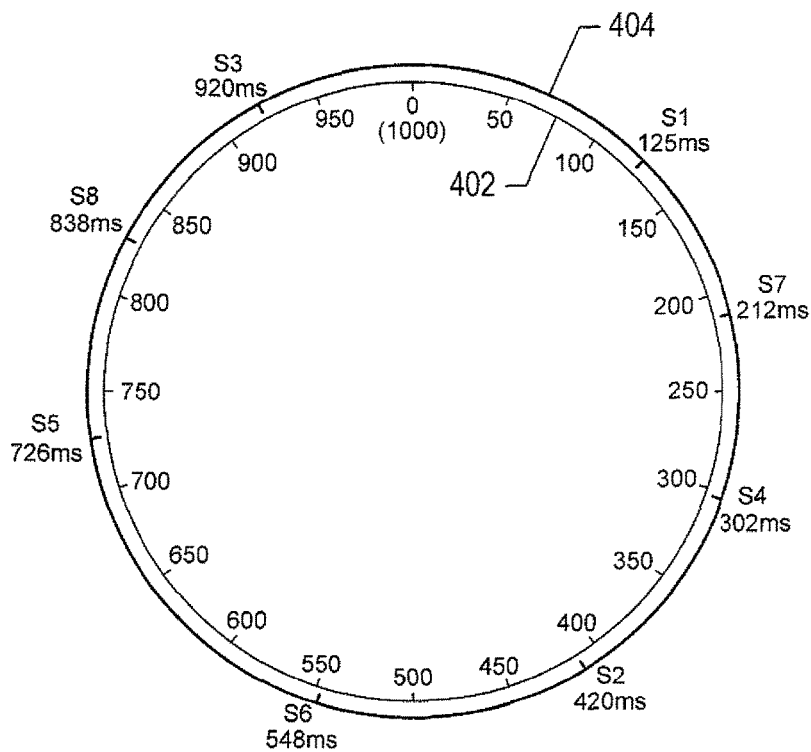
FIG. 4 shows a representing of time delays using time dials.

FIG. 4 shows an alternative way of representing the random seed time delays with respect to the shot interval using an inner time dial 402 and an outer time dial 404. The dials 402 and 404 are used below to illustrate the concept of shifting the random seed time delays and wrapping the shifted time delays that are greater than the duration of the shot interval described below. The inner time dial 402 represents the shot interval and is composed of a circle with 20 regularly spaced marks separated by 50 ms. The marks are labeled with points of time separated by 50 ms in the 1000 ms shot interval. The outer time dial 404 is composed of a circle with 8 markings that represent the random seed time delays initially assigned to the sources S1-S8. In the description below of pseudo-random ordering of the firing times of the sources S1-S8 in each shot interval, the outer time dial 404 is rotated with respect to the fixed position of the inner time dial 402 to illustrate how the time delays change for different shot intervals.

Figure 5A:
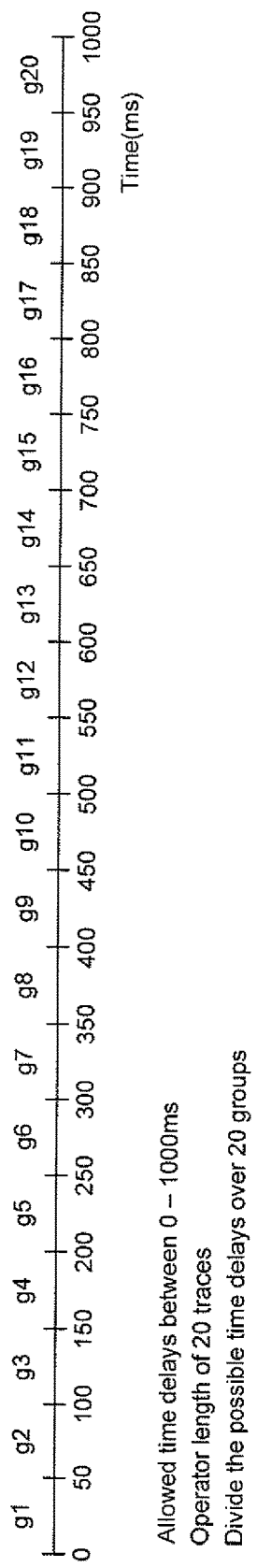
FIG. 5A shows a shot interval divided into duration groups.

For each shot interval of a marine-survey-time line, the order in which the sources S1-S8 are fired is pseudo-randomized. The pseudo-randomized order in which the sources S1-S8 are fired in a shot interval is determined by adding a pseudo-randomly selected time shift to the random seed time delays of the sources S1-S8. A method for pseudo-randomly selecting the order in which the sources S1-S8 are fired in a shot interval is now described with reference to FIGS. 5-12. The duration of the shot interval is divided by the operator length, which can be the length of a local data window in which data generated by the receivers is filtered for coherence. Because seismic data is generated in the form of traces, the operator length can be defined in terms of the number of traces in a domain. For example, in order to determine the filter results for a trace x, an example of a local data window is defined from trace x−4 up to trace x+4. From these 9 traces that lie within the local data window, a filter result is determined for trace x. Thus, for every trace in a full gather, the filter output is determined from a coherency filter with an operator length of 9 traces. In the example described below, the duration of the shot intervals are 0-1000 ms, which is divided by an operator length of 20 traces. In practice, the operator length can be any desired number of traces. As a result, the shot interval is divided into 20 sub-time intervals, called "duration groups," where each duration group has a duration of about 50 ms. FIG. 5A shows the shot interval from 0-1000 ms divided into 20 duration groups with each duration group denoted by gm, where m=1, 2, 3, . . . , 20 is the duration group index. FIG. 5B shows a listing of the 20 duration groups and the time intervals associated with each of the 20 duration groups. Note that for this example, the ratio of the number of duration groups to the number of traces in the operator length of a data window is one-to-one, which may be appropriate for a source-receiver or common-offset domain.

After the duration groups have been formed, the duration groups are placed in random order using pseudo randomization. FIG. 6 shows a random order of the duration groups shown in FIG. 5A in a direction represented by directional arrow 602. For example, duration group g7 is randomly selected as the first duration group, duration group g12 is randomly selected as the second duration group and so on with duration group g17 randomly selected as the last duration group. The duration groups are then arranged in a round-robin schedule as represented in FIG. 7. FIG. 7 shows a circle 702 with 20 regularly spaced dots labeled in a clockwise manner with the randomly sorted duration groups shown in FIG. 6. For example, dots 706-708 are identified by the first three duration groups g7, g12, and g5 in the pseudo randomly sorted duration groups displayed in FIG. 6, and dot 710 is identified by the last duration group g17 in the pseudo randomly sorted duration groups in FIG. 6.

The round-robin schedule of the pseudo randomly sorted duration groups, shown in FIG. 7, and the random seed, shown in FIG. 4, are used in combination to determine a random firing sequence for the sources S1-S8 in each shot interval in a marine-survey-time line as follows. For the first shot interval in a marine-survey-time line, the shortest time delay in the random seed is identified and the duration group in which the shortest time delay falls within is identified. For example, the random seed represented in FIGS. 3 and 4 reveals that the source S1 is assigned the shortest time delay of 125 ms, which falls within the duration group g3 as indicated by the list of duration group sub-time intervals shown in FIG. 5B. As a result, firing the sources S1-S8 in the first shot interval begins in the round-robin schedule shown in FIG. 7 with the duration group g3. In FIG. 7, the duration groups assigned to the first three shot intervals are identified by circled numbers 1, 2, and 3 with duration group g3 labeled by circled number 1 to indicate that duration group g3 contains the source with the shortest time delay.

Figure 8:
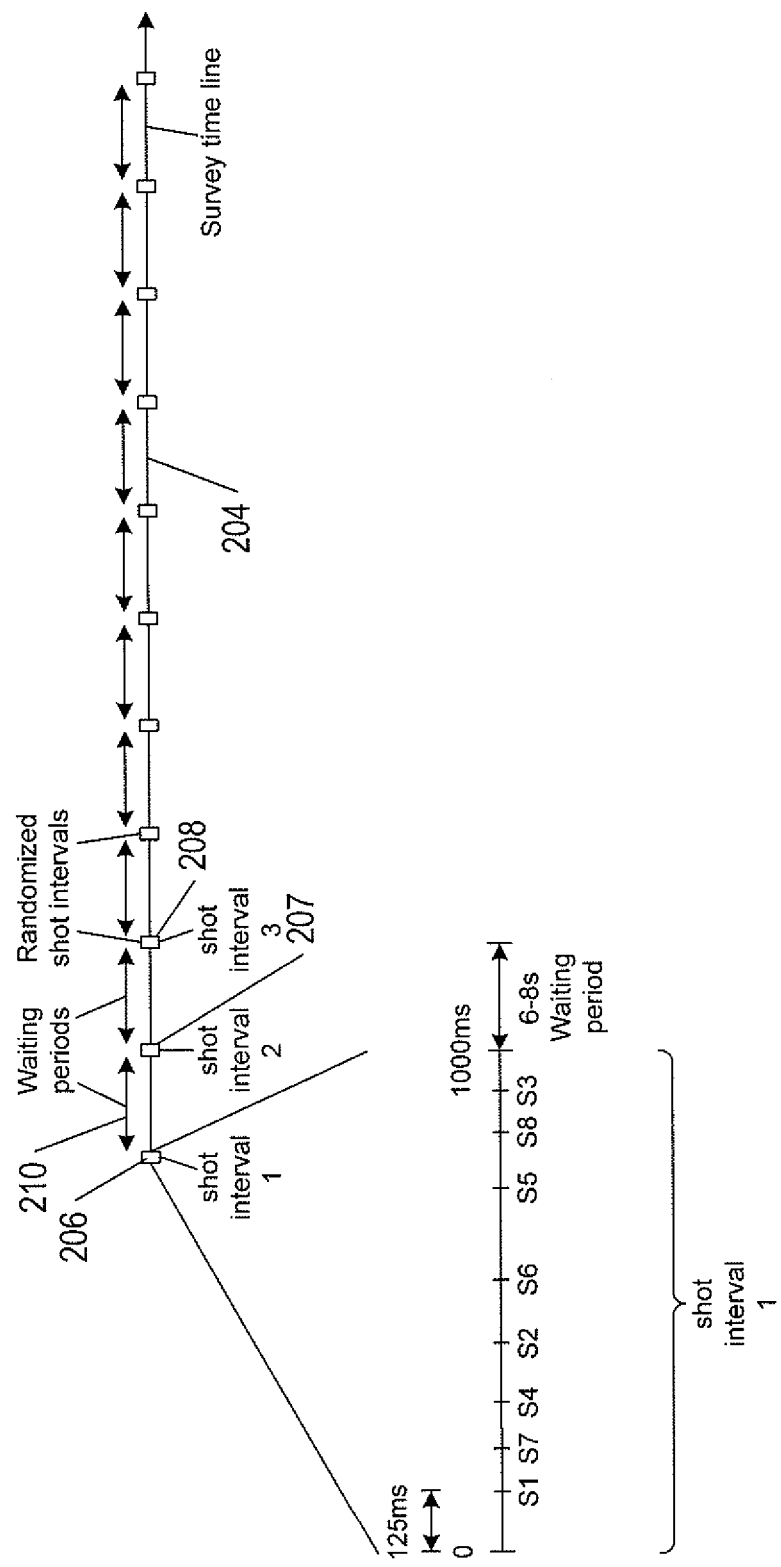
FIG. 8 shows a marine-survey-time line with a first shot interval expanded to reveal a sequence in which sources are fired.

At the beginning of the first shot interval, the sources S1-S8 are fired according to the random seed time delays. FIG. 8 shows the marine-survey-time line 204 with the first shot interval 206 expanded to reveal the sequence in which the sources S1-S8 are fired. In this example, the sources S1-S8 are fired according to the random seed time delays after the shot interval 206 begins. For example, source S1 is fired 125 ms after the shot interval begins followed by firing source S7 212 ms after the beginning of the shot interval, and the sources S4, S2, S6 S5, and S8 are fired according to the random seed time delays until the source S3 is fired 920 ms after the beginning of the shot interval. After the sources S1-S8 have been fired, the sources are reset, and when the shot interval expires at 1000 ms, a waiting period is allowed to pass before the second shot interval 207 begins.

For the second shot interval 207, a time delay is selected for the source with the shortest random seed time delay from the duration group that is next in the round-robin schedule shown in FIG. 7. For example, source S1 has the shortest random seed time delay and is assigned a randomly selected time delay, $t_{15}$, in the duration group g15. In other words, the source S1 can be assigned any time $t_{15}$ in the time interval 701-750 ms. The time delays for the remaining sources S2-S8 are shifted by adding the difference between time delay $t_{15}$ and the random seed time delay of 125 ms for the source S1 (i.e., $t_{15}$−125 ms) to each of the random seed time delays of the remaining sources S2-S8. When a shifted time delay is greater than the duration of the shot interval, the shifted time delay is adjusted by subtracting the duration of the shot interval so that the shifted time delay falls within the shot interval. Suppose the time delay $t_{15}$ selected for the source S1 in the duration group g15 is 725 ms. The difference between the selected time delay $t_{15}$=725 ms for the source S1 and the random seed time delay for the source S1 is 600 ms (i.e., 725−125 ms). Each of the random seed time delays of the remaining sources S2-S8 are also shifted by 600 ms. For example, the shifted time delays for the sources S7 and S4 are 812 ms (i.e., 212+600 ms) and 902 ms (302+600 ms), respectively. However, adding 600 ms to the random seed time delays for the sources S2, S6, S5, S8, and S3 produces shifted time delays that are greater than 1000 ms, which are outside the duration of the shot interval. The shifted time delays that are greater than the shot interval are corrected by subtracting the duration of the shot interval, which places the shifted time delays back into the shot interval with the differences between shot times maintained. In other words, the shifted time delays that are greater than the duration of the shot interval are "wrapped" back into the shot interval and are also called "wrap-around time delays." For example, the source S2 has a random seed time delay of 420 ms which is shifted to 1020 ms (i.e., 420+600 ms). Because the shifted time delay of 1020 ms is greater than 1000 ms, the shifted time delay is wrapped around back into the shot interval by subtracting 1000 ms to get a wrap-around time delay of 20 ms.

Figure 9:
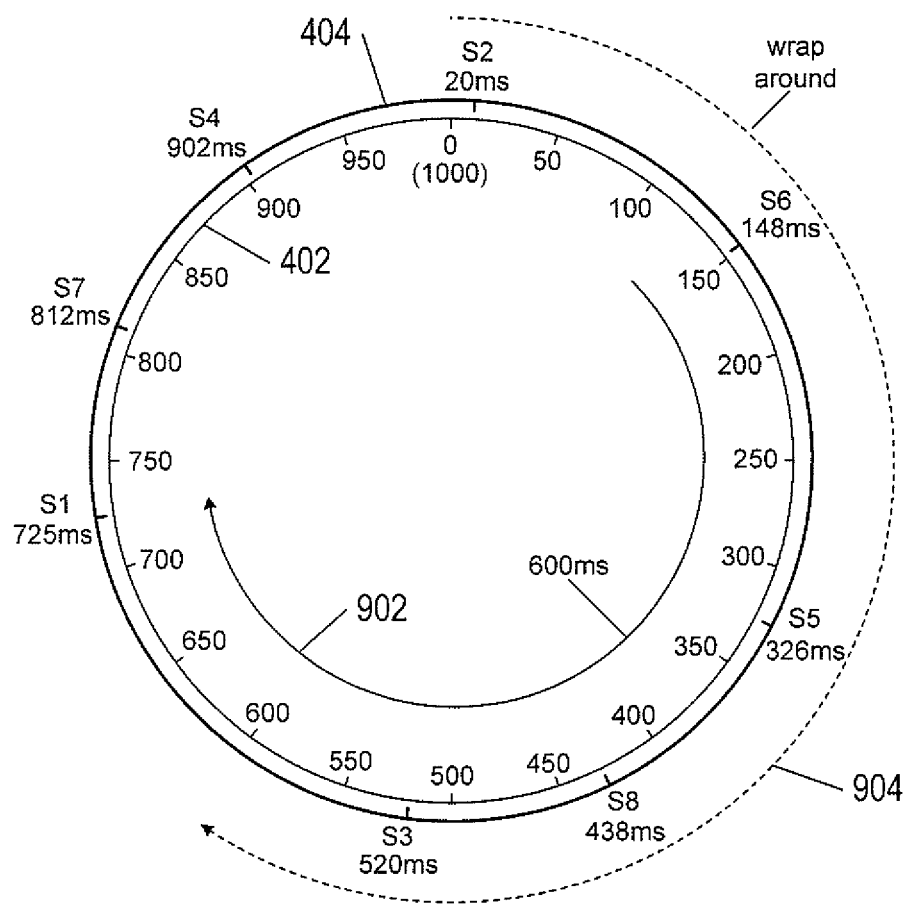
FIG. 9 shows an example of shifting time delays of sources.

FIG. 9 shows an example of shifting the time delays of the sources S1-S8 for the second shot interval 207 using the time dials 402 and 404 described above with reference to FIG. 4. Assigning shifted time delays to the sources S1-S8 is equivalent to rotating the outer time dial 404 in a clockwise direction by 600 ms as represented by directional arrow 902. The locations of the marks associated with each of the sources S1-S8 with respect to the inner dial 402 can be used to assign the shifted time delays for the second shot interval 207. Shifted time delays that fall within a region of the outer time dial 404 identified by a dashed-directional arrow 904 are also wrap-around time delays. At the beginning of the second shot interval, the sources S1-S8 are fired according to their assigned shifted time delays.

Figure 10:
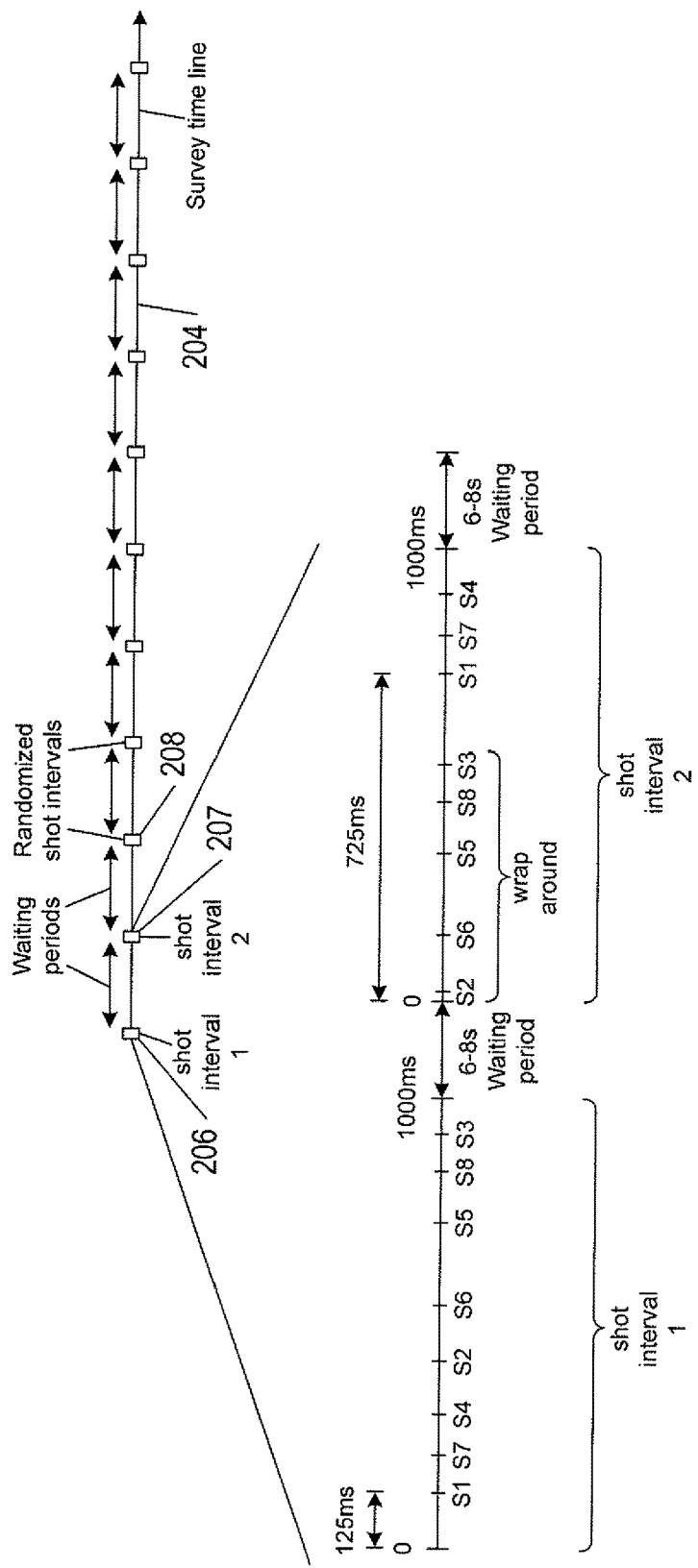
FIG. 10 shows a marine-survey-time line with first and second shot intervals expanded to reveal a sequence in which sources are fired.

FIG. 10 shows the marine-survey-time line 204 with the first and second shot intervals 206 and 207 expanded to reveal the time sequence in which the sources S1-S8 are fired. In the second shot interval 207, the sources S1-S8 are fired according to their assigned shifted time delays after the shot interval 207 begins as represented on the outer time dial 404 in FIG. 9. For example, source S2 is the first source fired at 20 ms after the shot interval begins followed by firing source S6, which is fired 148 ms after the beginning of the shot interval, and the sources S5, S8, S3 S1, and S4 are fired according to their associated shifted time delays represented in FIG. 9. After the sources S1-S8 have been fired, the sources are reset, and when the shot interval expires at 1000 ms, a waiting period is allowed to pass before the second shot interval 208 begins.

For the third shot interval 208, the time delay for the source with the shortest assigned time delay is chosen from the next duration group in the round-robin schedule shown in FIG. 7. As described above with reference to FIG. 3, source S1 is the source with the shortest random seed time delay and is assigned a shifted time delay $t_1$ in the duration group g1, which is the time interval 0-50 ms, as shown in FIG. 5B. Shifted time delays for the remaining sources S2-S8 are calculated by first calculating the difference between the time delay $t_1$ and the random seed time delay of 125 ms for the source S1 (i.e., $t_1$−125 ms) followed by adding the difference to each of the random seed time delays associated with the remaining sources S2-S8. For example, suppose the randomly selected time delay $t_1$ for the source S1 is 25 ms, which is in the duration group g1. The difference between the selected time delay $t_z$=25 ms for the source S1 and the random seed time delay for the source S1 is −100 ms (i.e., 25-125 ms). Shifted time delays for the remaining sources S2-S8 are calculated by adding the difference −100 ms to each of the random seed time delays for the sources S2-S8 described above with reference to FIG. 3. For example, the shifted time delays for the sources S7 and S4 are 112 ms (i.e., 212−100 ms) and 202 ms (302−100 ms), respectively.

Figure 11:
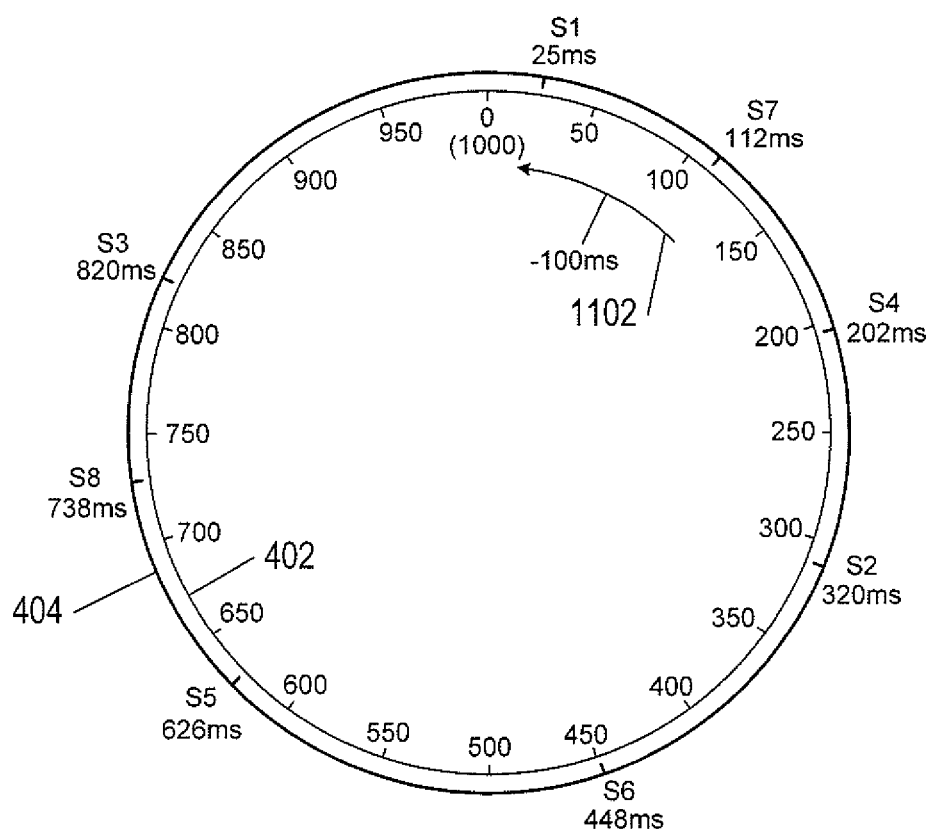
FIG. 11 shows an example of shifting time delays of sources.

FIG. 11 shows an example of shifting the time delays of the sources S1-S8 for the third shot interval 208 using the time dials 402 and 404 described above with reference to FIG. 4. Assigning shifted time delays to the sources S1-S8 is equivalent to rotating the outer time dial 404 in a counterclockwise direction by −100 ms as represented by directional arrow 1102. The locations of the marks associated with each of the sources S1-S8 with respect to the inner dial 402 can be used to assign shifted time delays to the sources S1-S8 for the third shot interval 208. At the beginning of the third shot interval 208, the sources S1-S8 are fired according to their assigned shifted time delays represented in FIG. 11.

Figure 12:
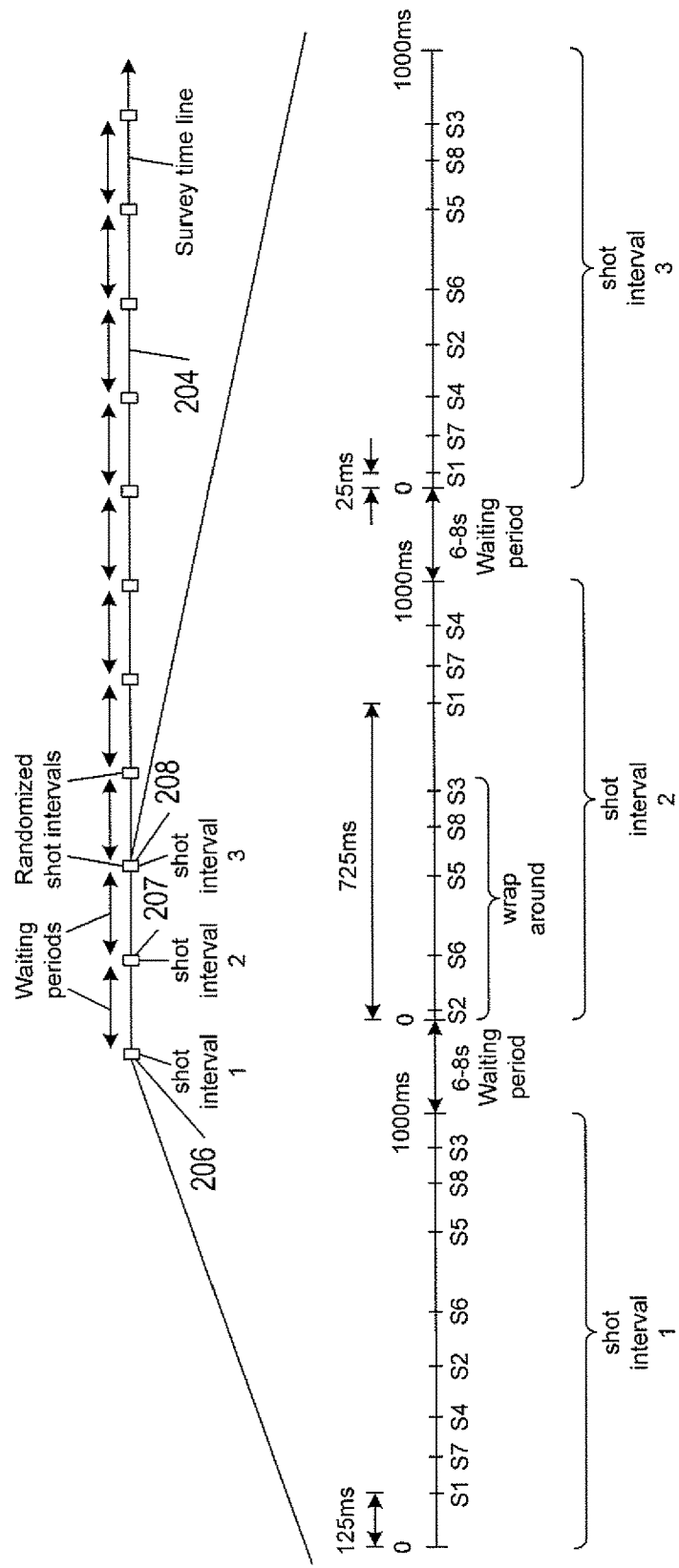
FIG. 12 shows a marine-survey-time line with three consecutive shot intervals expanded to reveal a sequence in which sources are fired.

FIG. 12 shows the marine-survey-time line 204 with the first, second, and third shot intervals 206-208 expanded to reveal the time sequence in which the sources S1-S8 are fired each of the shot intervals. In the third shot interval 208, the sources S1-S8 are fired according to their assigned shifted time delays after the shot interval 208 begins. The shifted time delays are represented on the outer time dial 404 in FIG. 9. For example, source S1 is the first source fired at 25 ms after the shot interval begins followed by firing the source S7, which is fired 112 ms after the beginning of the shot interval, and the sources S4, S2, S6, S5, S8, and S3 are fired according to their associated shifted time delays represented in FIG. 11.

In general, when a shot interval expires, the sources are reset and a waiting period is allowed to pass before the next shot interval begins. The method selects the next duration group gm from the round-robin schedule and the time delays for the next shot interval are shifted based on the time delay randomly selected for the source with the shortest random seed time delay as follows. Let D represent the length of a shot interval, $t_m$ represents a shifted time delay from the duration group gm for the source with the shortest random seed time delay, $t_s$ represents the random seed time delay for the source with the shortest random seed time delay, and $t_i$ represents the random seed time delay for the ith simultaneous source. Computation of the shifted time delays for each source can be executed by the follow pseudo code:

```
for (i = 1; i ≤ n; i++) {
    T_i = t_i + (t_m - t_s);
    if T_i > D, then
        T_i = T_i - D; /* wrap-around time delay */
    return T_i;
}
```

When the shot interval begins, the sources are fired according to the shifted time delays. The process of selecting a duration group from the round-robin schedule and shifting the random seed time delays can be repeated until the survey is completed.

Figure 13:
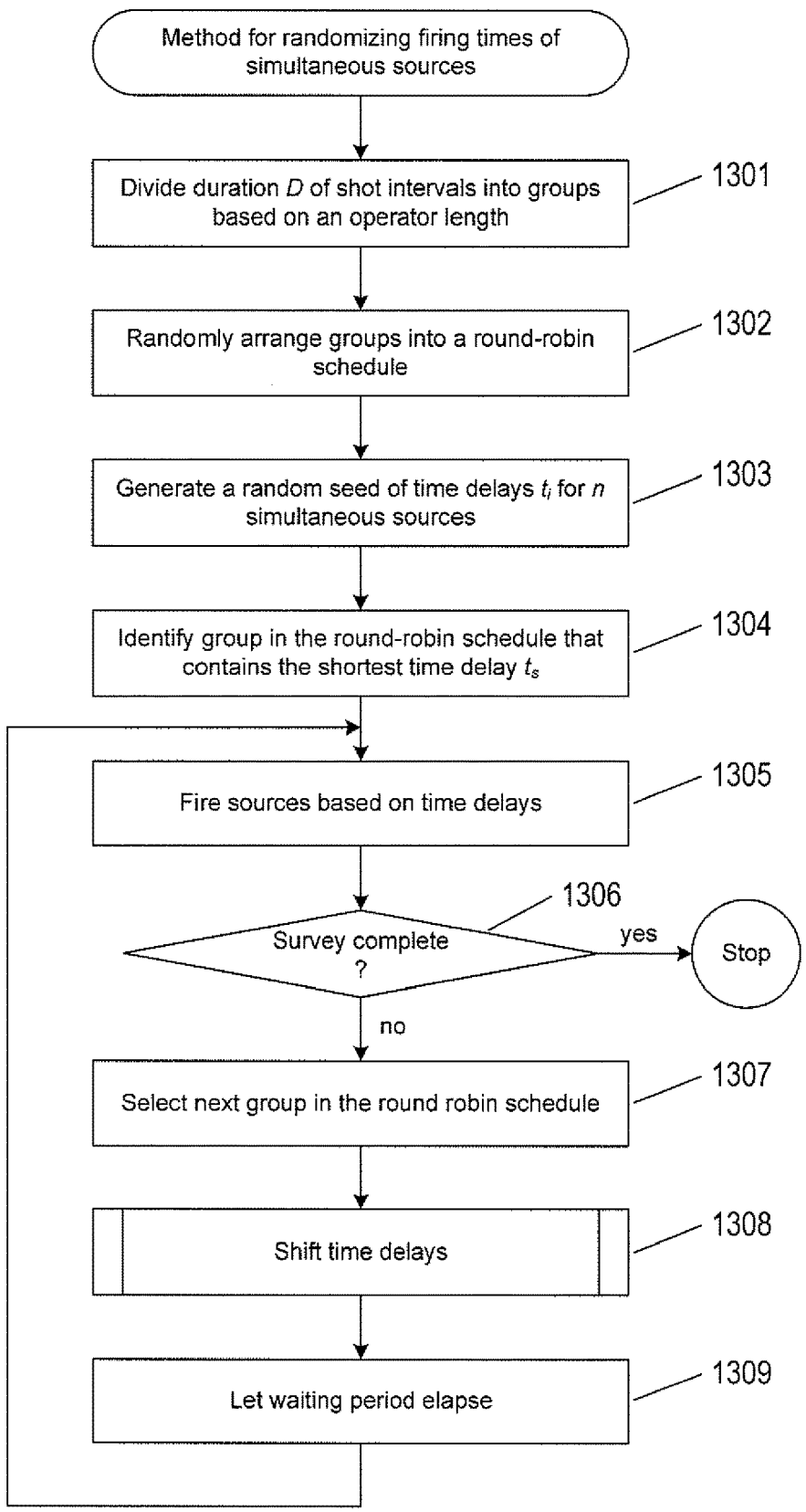
FIG. 13 shows a flow-control diagram of a method for randomizing firing times of a simultaneous source.

FIG. 13 shows a flow-control diagram of a method for randomizing firing times of a simultaneous source. In block 1301, a duration D of shot intervals in a marine-survey-time line are divided by an operator length selected for a coherency filter, as described above with reference to FIGS. 5A-5B. In block 1302, the duration groups are placed in a round-robin schedule based on random ordering using pseudo randomization, as described above with reference to FIGS. 6 and 7. In block 1303, a random seed of firing time delays is generated for n simultaneous sources as described above with reference to FIG. 3. In block 1304, the source with the shortest random seed time delay is identified and the duration group in the round-robin schedule in which the shortest random seed time delay falls is identified. In block 1305, the simultaneous sources are fired according to the time delays. In block 1306, when the survey is complete, the method stops; otherwise control flows to block 1307 and the operations in blocks 1307-1309, 1305, and 1306 are executed. In block 1307, the next duration group in the round-robin schedule is selected. In block 1308, a routine "shift time delays," described below with reference to FIG. 9, is called to shift the time delays of the sources according to the duration group selected in block 1307. In block 1309, the waiting period between shot intervals is allowed to elapse as described above with reference to FIG. 2.

Figure 14:
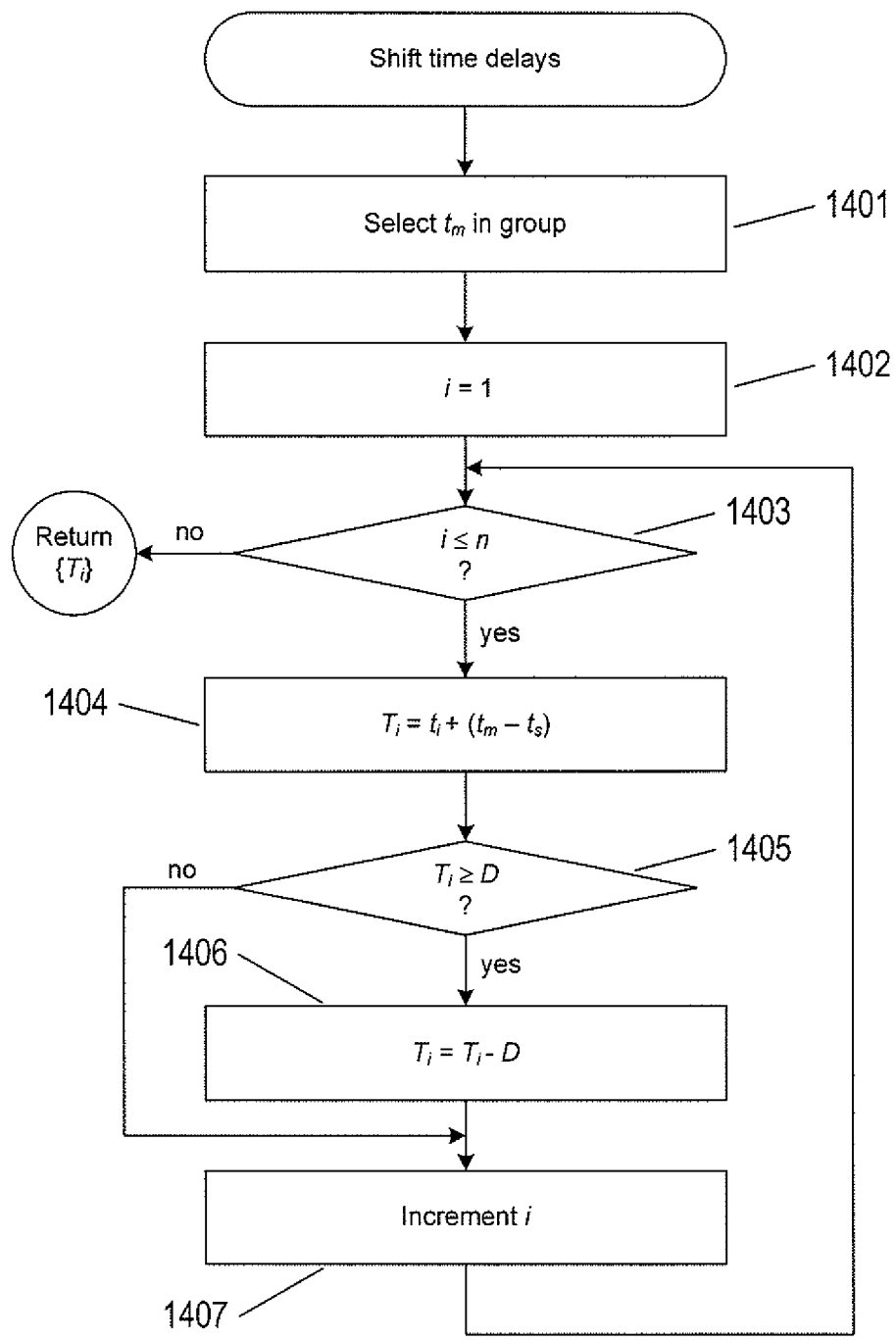
FIG. 14 shows a flow-control diagram of a method for shifting time delays called in block 1308 of the flow-control diagram of FIG. 13.

FIG. 14 shows a flow-control diagram of a method for shifting time delays called in block 1308 of the flow-control diagram of FIG. 13. In block 1401, a time delay, $t_m$, is randomly selected time delay from the duration group selected in step 1304 or step 1307 of FIG. 13 for the source with the shortest random seed time delay. In block 1402, the source index i is initialized to "1." In block 1403, when source index i is less than the number of simultaneous sources n, control flows to block 1404 in which a shifted time delay, $T_i$, is calculated; otherwise, a set of shifted time delays $\{T_i\}$ for the shot interval are returned in block 1308 of the method described in FIG. 13. In block 1405, when the shifted time delay $T_i$ is greater than the duration of the shot interval D, control flows to block 1406 in which the duration D is subtracted from the time delay $T_i$ to obtain a wrap-around time delay that is within the shot interval; otherwise, control flows to block 1407 in which the source index i is incremented and the operations executed in blocks 1403-1407 are repeated.

In the above described example embodiment, the number of duration groups is the same as the number of traces in the operator length of a data window. As a result, for each shot interval, a duration group is pseudo randomly selected to determine the randomized time delays within each shot interval, which is suitable for the source-receiver or common-offset domain in which the ratio of number of duration groups to the number of traces in the operator length is one-to-one. However, it should be noted that the separation operator may be applied to other domains, such as the common-midpoint domain. The spacing of the traces in the common-midpoint domain is larger than the common-offset domain, which depends on the ratio between the distance between shots versus the distance between the different traces within one shot (i.e., often 2 or 4). As a result, the number of traces in the operator length is not necessarily equal to the number of duration groups used to execute the pseudo-randomization method described above. Embodiments include selecting the number of duration groups based on the operator length in the domain where separation is accomplished. In other words, in the common-midpoint domain the ratio of the number of duration groups to the number of traces or the operator length may be two-to-one or four-to-one. For example, when the operator length in the common-midpoint domain (i.e., number of traces in the common-midpoint domain) is five with a source/trace spacing ratio of two-to-one, the number of duration groups in the round robin schedule is 9. In particular, consider nine shots 1, 2, 3, 4, 5, 6, 7, 8, and 9 of dual sources (flip and flop) in the common-midpoint domain. For a common-midpoint line belonging to the flip shots 2, 4, 6, and 8, only flop shots 1, 3, 5, 7, and 9 contribute to the operator length of 5 traces. A shot 10 would contribute to the flop common-midpoint line. As a result, only 9 consecutive shots would have to be pseudo randomized. Note that the ratio returns to 1:1 when the flips and flop shots are treated separately. Alternatively, when the operator length in the common-midpoint domain is five with a source/trace spacing ratio of four-to-one, the number of duration groups in the round-robin schedule is 20.

Figure 15:
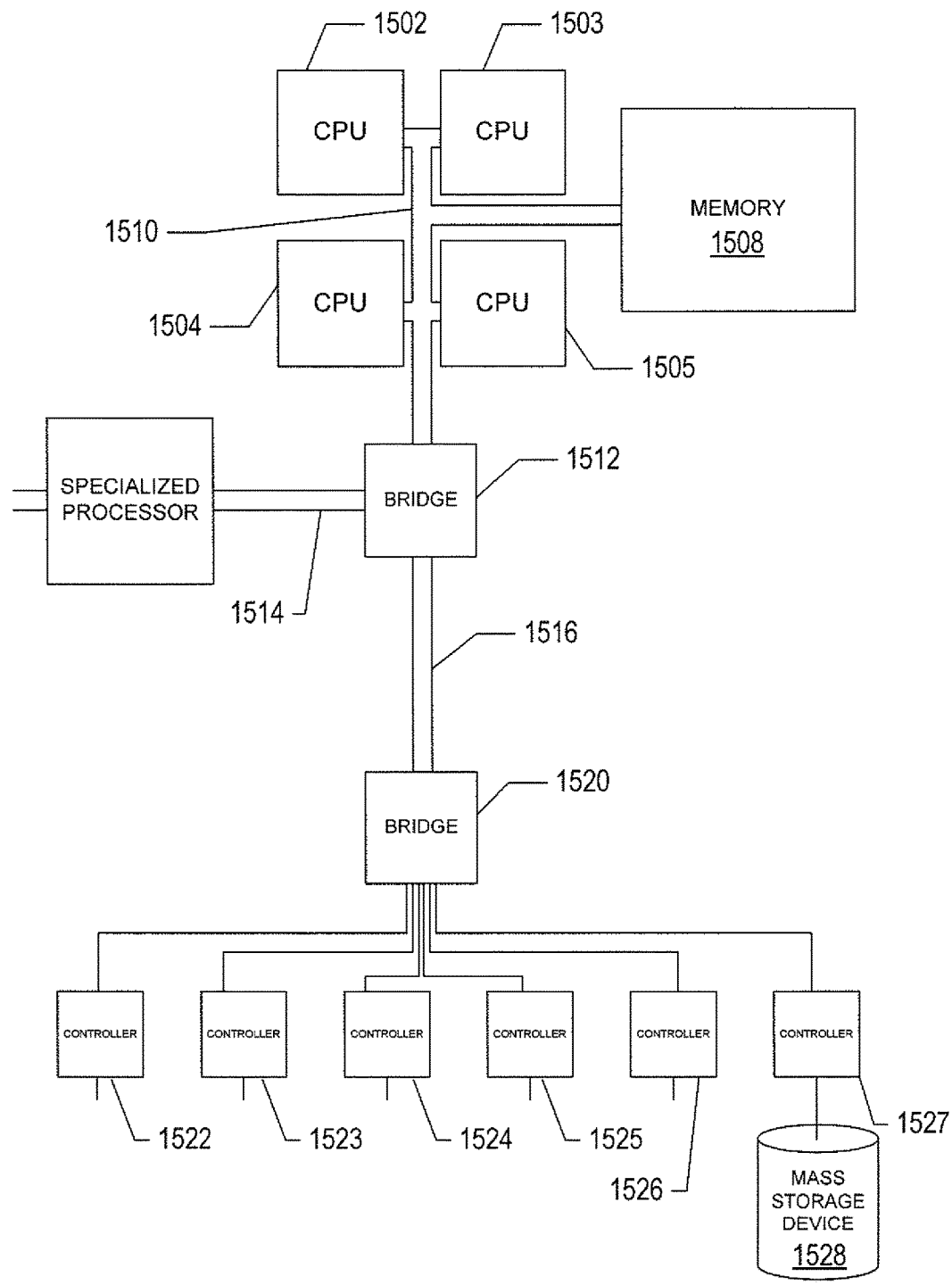
FIG. 15 shows one illustrative example of a generalized computer system that executes a method for randomizing firing times of simultaneous sources.

FIG. 15 shows one illustrative example of a generalized computer system that executes an efficient method for randomizing firing times of simultaneous sources and therefore represents a data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1502-1505, one or more electronic memories 1508 interconnected with the CPUs by a CPU/memory-subsystem bus 1510 or multiple busses, a first bridge 1512 that interconnects the CPU/memory-subsystem bus 1510 with additional busses 1514 and 1516, or other types of high-speed interconnection media, including multiple, high-speed serial interconnects. The busses or serial interconnections, in turn, connect the CPUs and memory with specialized processors, such as a graphics processor 1518, and with one or more additional bridges 1520, which are interconnected with high-speed serial links or with multiple controllers 1522-1527, such as controller 1527, that provide access to various different types of computer-readable media, such as computer-readable medium 1528, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1528 is a data-storage device, including electronic memory, optical or magnetic disk drive, USB drive, flash memory and other such data-storage device. The computer-readable medium 1528 can be used to store machine-readable instructions that encode the computational methods described above and can be used to store encoded data, during store operations, and from which encoded data can be retrieved, during read operations, by computer systems, data-storage systems, and peripheral devices.

After the sources have been fired in a shot interval, each source is aligned with a set of recorded data. Consider, for example, a simultaneous source with n different sources. A data set recorded in a shot interval is aligned with a source Sm by shifting the time associated with the recorded data set by the same time delay assigned to the source Sm in the shot interval. When sorting to a particular domain, such as the common-receiver domain or common-midpoint domain, the energy produced by the source Sm is coherent while the energy produced by the remaining sources is incoherent. The same holds for alignment of the recorded data with each of the other sources. The recorded data can be aligned with any of the sources, making that energy coherent and energy from the other sources incoherent.

Various embodiments described herein are not intended to be exhaustive of or to limit this disclosure to the precise forms described above. For example, any number of different computational-processing-method implementations that carry out the methods for randomizing firing times of simultaneous source may be designed and developed using various different programming languages and computer platforms and by varying different implementation parameters, including control structures, variables, data structures, modular organization, and other such parameters. The systems and methods for randomizing firing times of simultaneous source can be executed in near-real time while conducting a marine survey of a subterranean formation. The term "near-real time" refers to a time delay due to data transmission and data processing that is short enough to allow timely use of the firing time delays computed during a seismic data acquisition survey. For example, near-real time can refer to a situation in which generating the time delays and transmitting corresponding firing signals to the simultaneous source is insignificant. In other embodiments, the time delays for each shot interval and waiting periods of a seismic data acquisition survey can be calculated in advance and stored in a computer-readable medium. When the survey begins, the simultaneous sources can be fired according to the predetermined sequence of time delays and waiting periods. Embodiments include other randomization implementations provided the randomized time delays for the secondary sources are within one operator length and cannot be identical or within a user-specified minimum length of time. The data window may also have a cross-line component, such as a component that is perpendicular or angular to the in-line direction. As a result, when the data window has in-line and cross-line components, the data window is not limited to a one-dimensional operator length, but instead has an "operator area." The methods described above can be used with any kind of marine survey, such as surveys with straight survey tracks or coil-shooting surveys.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for activating multiple sources towed by one or more survey vessels, the method comprising:
   generating a set of seed time delays;
   assigning each seed time delay to one of the multiple sources;
   for each shot interval of a marine-survey-time line,
      randomly selecting a time delay that is less than a duration of the shot interval;
      pseudo-randomly shifting the seed time delays based on the time delay to generate shifted time delays within the shot interval, each shifted time delay associated with one of the multiple sources; and
      firing the multiple sources within the shot interval based on the assigned shifted time delays.

2. The method of claim 1, wherein generating the set of seed time delays includes randomly generating seed time delays that are within the duration of the shot intervals.

3. The method of claim 1 further comprises
   dividing a duration of the shot intervals of the marine-survey-time line into a set of duration groups;
   pseudo-randomly arranging the duration groups into a schedule of duration groups; and
   for each shot interval of the marine-survey-time line,
      pseudo randomly selecting a duration group from the set of duration groups;
      randomly selecting the time delay from the selected duration group; and
      pseudo-randomly shifting the seed time delays to generate the shifted time delays by
      assigning the time delay to the source of the multiple sources with a shortest seed time delay,
      calculating a difference between the time delay and the shortest seed time delay, and
      adding the difference to the seed time delays of remaining sources to generate shifted time delays of the remaining sources.

4. The method of claim 3, wherein dividing the duration of the shot intervals into the set of duration groups includes determining the number of duration groups based on a ratio of the number of duration groups to the number of traces in an operator length of a data window, the ratio equal to one or greater than one.

5. The method of claim 3, pseudo randomly selecting the duration group includes:
   randomly arranging the duration groups in the set into a sequence; and
   for each shot interval, selecting the duration group according to the sequence.

6. The method of claim 3, wherein calculating the shifted time delays for the multiple sources includes:
   selecting a time delay in the randomly selected duration group;
   calculating a difference between the time delay and the selected time delay; and
   adding the difference to the time delay of each of the multiple sources to generate a shifted time delay for each source.

7. The method of claim 6 further comprises when a shifted time delay associated with a source is greater than the duration of the shot intervals, subtracting the duration of the shot interval from the shifted time delay to generate a wrap-around shifted time delay associated with the source, the wrap-around shifted time delay within the shot interval.

8. The method of claim 1 further comprises
resetting the multiple sources for a subsequent shot interval; and
allowing a waiting period to elapse between shot intervals.

9. The method of claim 1 wherein firing the multiple sources within the shot interval based on the shifted time delays includes firing the sources in order from the shortest shifted time delay to the longest shifted time delay with respect to the beginning of the shot interval.

10. The method of claim 1 wherein each source further comprises air guns, water guns, marine vibrators, or an electromagnetic-field source.

11. A computer system for pseudo-randomizing the order in which multiple sources are fired in simultaneous source acquisition, the computer system comprising:
one or more processors;
one or more data-storage devices; and
a routine stored in one or more of the one or more data-storage devices that when executed by the one or more processors controls the computer system to carry out:
generating a set of seed time delays;
assigning each seed time delay to one of the multiple sources towed by one or more marine survey vessels;
for each shot interval of a marine-survey-time line,
randomly selecting a time delay that is less than a duration of the shot interval;
pseudo-randomly shifting the seed time delays based on the time delay to generate shifted time delays within the shot interval, each shifted time delay associated with one of the multiple sources; and
firing the multiple sources within the shot interval based on the assigned shifted time delays.

12. The system of claim 11, wherein generating the set of seed time delays includes randomly generating seed time delays that are within the duration of the shot intervals.

13. The system of claim 11 further comprises
dividing a duration of the shot intervals of the marine-survey-time line into a set of duration groups;
pseudo-randomly arranging the duration groups into a schedule of duration groups; and
for each shot interval of the marine-survey-time line,
pseudo randomly selecting a duration group from the set of duration groups;
randomly selecting the time delay from the selected duration group; and
pseudo-randomly shifting the seed time delays to generate the shifted time delays by
assigning the time delay to the source of the multiple sources with a shortest seed time delay,
calculating a difference between the time delay and the shortest seed time delay, and
adding the difference to the seed time delays of remaining sources to generate shifted time delays of the remaining sources.

14. The system of claim 13, wherein dividing the duration of the shot intervals into duration groups includes determining the number of duration groups based on a ratio of the number of duration groups to the number of traces in an operator length of a data window, the ratio equal to one or greater than one.

15. The system of claim 13, pseudo randomly selecting the duration group includes:
randomly arranging the duration groups in the set into a sequence; and
for each shot interval, selecting the duration group according to the sequence.

16. The system of claim 13, wherein calculating the shifted time delays for the multiple sources includes:
selecting a time delay in the randomly selected duration group;
calculating a difference between the time delay and the selected time delay; and
adding the difference to the time delay of each of the multiple sources to generate a shifted time delay for each source.

17. The system of claim 16 further comprises when a shifted time delay associated with a source is greater than the duration of the shot intervals, subtracting the duration of the shot interval from the shifted time delay to generate a wrap-around shifted time delay associated with the source, the wrap-around shifted time delay within the shot interval.

18. The system of claim 11 further comprises
resetting the multiple sources for a subsequent shot interval; and
allowing a waiting period to elapse between shot intervals.

19. The system of claim 11 wherein firing the multiple sources within the shot interval based on the shifted time delays includes firing the sources in order from the shortest shifted time delay to the longest shifted time delay with respect to the beginning of the shot interval.

20. The system of claim 11 further comprising storing the shifted time delays in the one or more data-storage devices.

21. The system of claim 11 wherein each source further comprises air guns, water guns, marine vibrators, or an electromagnetic-field source.

22. A computer-readable medium having machine-readable instructions encoded thereon for enabling one or more processors of a computer system to perform the operations of
generating a set of seed time delays;
assigning each seed time delay to one of two or more sources towed by one or more marine survey vessels;
randomly selecting a time delay that is less than a duration of the shot interval;
generating pseudo-randomly shifted time delays based on the time delay for each shot interval of a marine-survey-time line, each shifted time delay assigned to one of the two or more sources; and
firing the two or more sources within each shot interval based on the assigned shifted time delays.

23. The medium of claim 22 further comprises
dividing a duration of the shot intervals of the marine-survey-time line into a set of duration groups;
pseudo-randomly arranging the duration groups into a schedule of duration groups; and
for each shot interval of the marine-survey-time line,
pseudo randomly selecting a duration group from the set of duration groups;
randomly selecting the time delay from the selected duration group; and
pseudo-randomly shifting the seed time delays to generate the shifted time delays by
assigning the time delay to the source of the multiple sources with a shortest seed time delay,
calculating a difference between the time delay and the shortest seed time delay, and
adding the difference to the seed time delays of remaining sources to generate shifted time delays of the remaining sources.

24. The medium of claim 23, wherein dividing the duration of the shot intervals into duration groups includes determining the number of duration groups based on a ratio of the number of duration groups to the number of traces in an operator length of a data window, the ratio equal to one or greater than one.

25. The medium of claim 23, pseudo randomly selecting the duration group includes:
   randomly arranging the duration groups in the set into a sequence; and
   for each shot interval, selecting the duration group according to the sequence.

26. The medium of claim 23, wherein calculating the shifted time delays for the sources includes:
   selecting a time delay in the randomly selected duration group;
   calculating a difference between the time delay and the selected time delay; and
   adding the difference to the time delay of each source to generate a shifted time delay for each source.

27. The medium of claim 26 further comprises when the shifted time delay associated with a source is greater than the duration of the shot intervals, subtracting the duration of the shot interval from the shifted time delay to generate a wrap-around shifted time delay associated with the source, the wrap-around shifted time delay within the shot interval.

28. The medium of claim 23 further comprises
   resetting the two or more sources for a subsequent shot interval; and
   allowing a waiting period to elapse between shot intervals.

29. The medium of claim 23 wherein firing the sources within the shot interval based on the shifted time delays includes firing the sources in order from the shortest shifted time delay to the longest shifted time delay with respect to the beginning of the shot interval.

30. The medium of claim 22 wherein each source further comprises air guns, water guns, marine vibrators, or an electromagnetic-field source.

31. A marine seismic data acquisition system comprising:
   multiple sources; and
   a computer system for operating the seismic source comprising:
      one or more processors;
      one or more data-storage devices; and
      a routine stored in one or more of the one or more data-storage devices that when executed by the one or more processors controls the computer system to carry out:
      generating a set of seed time delays;
      assigning each seed time delay to one of the multiple sources towed by one or more marine survey vessels;
      for each shot interval of a marine-survey-time line,
         randomly selecting a time delay that is less than a duration of the shot interval;
         pseudo-randomly shifting the seed time delays based on the time delay to generate shifted time delays within the shot interval, each shifted time delay associated with one of the multiple sources; and
         firing the multiple sources within the shot interval based on the assigned shifted time delays.

32. The system of claim 31, wherein generating the set of seed time delays includes randomly generating seed time delays that are within the duration of the shot intervals.

33. The system of claim 31 further comprises
   dividing a duration of the shot intervals of the marine-survey-time line into a set of duration groups;
   pseudo-randomly arranging the duration groups into a schedule of duration groups; and
   for each shot interval of the marine-survey-time line,
      pseudo randomly selecting a duration group from the set of duration groups;
      randomly selecting the time delay from the selected duration group; and
      pseudo-randomly shifting the seed time delays to generate the shifted time delays by
         assigning the time delay to the source of the multiple sources with a shortest seed time delay,
         calculating a difference between the time delay and the shortest seed time delay, and
         adding the difference to the seed time delays of remaining sources to generate shifted time delays of the remaining sources.

34. The system of claim 31, wherein dividing the duration of the shot intervals into the set of duration groups includes determining the number of duration groups based on a ratio of the number of duration groups to the number of traces in an operator length of a data window, the ratio equal to one or greater than one.

35. The system of claim 31, pseudo randomly selecting the duration group includes:
   randomly arranging the duration groups in the set into a sequence; and
   for each shot interval, selecting the duration group according to the sequence.

36. The system of claim 31, wherein calculating the shifted time delays for the sources includes:
   selecting a time delay in the randomly selected duration group;
   calculating a difference between the time delay and the selected time delay; and
   adding the difference to the time delay of each of the multiple sources to generate a shifted time delay for each source.

37. The system of claim 36 further comprises when a shifted time delay associated with a source is greater than the duration of the shot intervals, subtracting the duration of the shot interval from the shifted time delay to generate a wrap-around shifted time delay associated with the source, the wrap-around shifted time delay within the shot interval.

38. The system of claim 36 further comprises
   resetting the sources for a subsequent shot interval; and
   allowing a waiting period to elapse between shot intervals.

39. The system of claim 31 wherein firing the sources within the shot interval based on the shifted time delays includes firing the sources in order from the shortest shifted time delay to the longest shifted time delay with respect to the beginning of the shot interval.

40. The system of claim 31 further comprising storing the shifted time delays in the one or more data-storage devices.

41. The system of claim 31 wherein each source further comprises air guns, water guns, marine vibrators, or an electromagnetic-field source.

42. A method of generating source activation times, the method comprising:
   generating a random sequence of seed time delays;
   assigning one of the seed time delays to each source of multiple sources; and
   for each shot interval of a marine-survey-time line,
      randomly selecting a time delay that is less than a duration of the shot interval;
      randomly generating a time shift based on the time delay, and
      applying the time shift to each of the seed time delays.

43. The method of claim 42, wherein generating the random sequence of seed time delays includes generating the seed time delays within a duration of the shot intervals.

44. The method of claim 42 wherein randomly generating the time shift, and applying the time shift to each of the seed time delays further comprises:
  dividing the duration of the shot intervals into time duration groups;
  randomly ordering the duration groups into a round-robin schedule;
  for a first shot interval of the shot intervals of the marine-survey-time line,
    assigning the random sequence of seed time delays to the sources as source firing time, and
    identifying the duration group in the round-robin schedule that contains the shortest time delay of the sequence of time delays; and
  for each shot interval after the first shot interval,
    randomly selecting the time delay in a next duration group of the round-robin schedule,
    calculating the time shift as a difference between the shortest time delay in the sequence of time delays and the randomly selected time delay,
    adding the time shift to the seed time delays assigned to each of the sources, and
    assigning the shifted time delays to the sources as source firing times.

45. The method of claim 44, further comprising when a shifted time delay associated with a source is greater than the duration of the shot interval, subtracting the duration of the shot interval from the shifted time delay to generate a wrap-around shifted time delay associated with the source within the shot interval.

46. The method of claim 44, wherein dividing the duration of the shot intervals into the duration groups includes determining the number of duration groups based on a ratio of the number of duration groups to the number of traces in an operator length of a data window, the ratio equal to one or greater than one.

47. The method of claim 42, further comprising
  resetting the multiple sources for a subsequent shot interval; and
  allowing a waiting period to elapse between shot intervals.

48. The method of claim 42 wherein further comprising firing the sources in order from the shortest shifted time delay to the longest shifted time delay with respect to the beginning of the shot interval.

49. The method of claim 42, further comprising firing the sources in each shot interval with the assigned time delays shifted by the time shift generated for the shot interval.

50. The method of claim 42, further comprising storing shifted time delays for each shot interval in a physical data storage device.

* * * * *